(12) United States Patent  (10) Patent No.: US 8,863,937 B2
Buchenberg et al.  (45) Date of Patent: Oct. 21, 2014

(54) CONVEYOR LANE DIVIDER

(71) Applicant: Multivac Sepp Haggenmüller GmbH & Co. KG, Wolfertschwenden (DE)

(72) Inventors: Wolfgang Buchenberg, Oy-Mittelberg (DE); Alireza Taghipour, Kempten (DE); Alexander Kult, Kempten (DE); Bernd Happach, Blaichach (DE); Albert Gabler, Wolfertschwenden (DE)

(73) Assignee: Multivac Sepp Haggenmueller GmbH & Co. KG, Wolfertschwenden (DE)

( * ) Notice: Subject to any disclaimer, the term of this patent is extended or adjusted under 35 U.S.C. 154(b) by 0 days.

(21) Appl. No.: 13/659,448

(22) Filed: Oct. 24, 2012

(65) Prior Publication Data

US 2013/0105278 A1  May 2, 2013

(30) Foreign Application Priority Data

Oct. 27, 2011 (DE) .......................... 10 2011 117 242

(51) Int. Cl.
B65G 47/00 (2006.01)
B65G 43/08 (2006.01)
B65G 47/31 (2006.01)
B65G 47/71 (2006.01)

(52) U.S. Cl.
CPC ................ B65G 43/08 (2013.01); B65G 47/31 (2013.01); B65G 47/71 (2013.01)
USPC ................. 198/445; 198/341.02; 198/341.03; 198/341.08; 198/436; 198/437; 198/368; 198/426

(58) Field of Classification Search
USPC ............. 198/341.01, 341.03, 341.08, 341.07, 198/345.1, 364, 890, 890.1, 368, 426, 436, 198/437, 444, 461.1, 461.2
See application file for complete search history.

(56) References Cited

U.S. PATENT DOCUMENTS

| | | | | |
|---|---|---|---|---|
| 1,869,457 A * | 8/1932 | Benoit | ............................. | 53/247 |
| 4,003,462 A * | 1/1977 | Perrott | ...................... | 198/369.2 |
| 5,174,430 A | 12/1992 | Ebira | | |
| 5,314,055 A * | 5/1994 | Gordon | ......................... | 198/395 |
| 5,400,895 A * | 3/1995 | Hollingsworth et al. | ...... | 198/367 |
| 5,971,134 A | 10/1999 | Trefz et al. | | |
| 6,213,285 B1 * | 4/2001 | Smith | ......................... | 198/465.1 |
| 6,275,743 B1 * | 8/2001 | Kondo et al. | .................. | 700/214 |
| 6,840,369 B2 * | 1/2005 | Derenthal et al. | ............. | 198/426 |
| 7,814,031 B2 * | 10/2010 | Nicolas et al. | ................. | 705/400 |
| 2004/0134751 A1 | 7/2004 | Beck et al. | | |
| 2004/0226803 A1 * | 11/2004 | Brixius et al. | ............ | 198/370.1 |
| 2005/0247542 A1 * | 11/2005 | Salvoni | ......................... | 198/436 |
| 2006/0070927 A1 | 4/2006 | Henry | | |
| 2011/0220460 A1 * | 9/2011 | Seger et al. | .................... | 198/437 |
| 2012/0298482 A1 * | 11/2012 | Hu et al. | ........................ | 198/437 |

FOREIGN PATENT DOCUMENTS

| | | |
|---|---|---|
| DE | 2531967 A1 | 2/1976 |
| DE | 2544499 A1 | 4/1977 |
| EP | 0480436 A2 | 4/1992 |
| EP | 2361858 A1 | 8/2011 |
| FR | 2433375 A1 | 3/1980 |
| GB | 1392932 A * | 5/1975 |
| WO | 2010078664 A1 | 7/2010 |

* cited by examiner

*Primary Examiner* — Gene Crawford
*Assistant Examiner* — Lester Rushin
(74) *Attorney, Agent, or Firm* — Husch Blackwell LLP

(57) ABSTRACT

The invention concerns a conveyor lane divider for dividing trays that are received in one lane from an infeed conveyor and are passed on to a two-lane production unit. The conveyor lane divider has a line motion control system that can be automatically initialized when starting.

17 Claims, 9 Drawing Sheets

CONVEYOR LANE DIVIDER

CROSS-REFERENCE TO RELATED APPLICATIONS

This Application claims priority to German Application Number 102011117242.8 filed Oct. 27, 2011, to Wolfgang Buchenberg, Alireza Taghipour, Alexander Kult, and Bernd Happach entitled "Conveyor Lane Divider," currently pending, the entire disclosure of which is incorporated herein by reference.

FIELD OF THE INVENTION

The invention relates to a conveyor lane divider for dividing trays and a method for automatically initializing a conveyor lane divider.

BACKGROUND OF THE INVENTION

Conveyor lane dividers are known from general practice for the purpose of dividing trays into two lanes that have been received from a one-lane feeding system by the conveyor lane divider. At the end of the conveyor lane divider, a stop element is provided for each lane in order to forward the first row with two trays to a subsequent two-lane tray sealer. A conventional conveyor lane divider of this nature is shown in FIG. 1.

The conveyor lane divider in this example has a single conveyor belt. A photoelectric barrier is provided at the beginning of the conveyor lane divider in order to count the trays that are received from the feeding system and to communicate the count to the conveyor lane divider's controller. Then the trays move along a dividing device to be placed in a designated lane. Another photoelectric barrier is mounted directly after the dividing device in order to sense the back end of a tray. The controller adjusts the dividing device such that all trays required in a lane for a format are distributed sequentially by lane, which is to say that the first trays are distributed to the first lane as a first group and then the subsequent trays are distributed to the second lane, again as a group. In order to produce a distance between the last tray of a first group and the first tray of a following group required for the changeover of the dividing device, the belt speed is briefly increased as soon as the first photoelectric barrier has sensed the back end of the last tray of a group at the beginning of the conveyor lane divider.

At restart, no trays can be located anywhere on the conveyor lane divider because the controller cannot ascertain whether trays have been removed from the conveyor lane divider during the stoppage or have additionally been placed on empty belt areas. Yet oftentimes the operator has no place to put the trays that have been removed, making it commensurately difficult to clear the machine. Initialization of the conveyor lane divider is always based on the assumption that there are "no trays inside the conveyor lane divider." When the number of trays in a group differs from the designated number, problems and machine stoppages result in the subsequent tray sealer. Moreover, it can occur during the production process that trays are removed from the conveyor lane divider for quality assurance, which also leads to problems in the tray sealer.

SUMMARY OF THE INVENTION

The object of the present invention is to provide a conveyor lane divider in order to increase output and to improve it such that it is possible to eliminate the process of clearing trays off a conveyor lane divider prior to startup.

The conveyor lane divider according to the invention for dividing a one-lane flow of trays into two or more lanes may comprise four conveyor units ("first through fourth") in succession in a direction of transport, each of which may have a drive, and further comprises a divider sensor and two lane sensors, a divider unit, two release stops and two pre-stops. The release stops are designed to simultaneously release a first row of trays (i.e., the forwardmost trays in each of the two lanes) for further transport to a subsequent production unit, preferably a tray sealer. A lane sensor can be provided between the release stop and the pre-stop of each lane in order to detect the presence of a tray between the release stop and the pre-stop and/or the back end of the tray for every lane. This ensures for the subsequent production unit that one tray per lane of the conveyor lane divider is always conveyed onward, thereby preventing empty positions, for example in a sealing station, and thus eliminating production stoppages. By arranging four conveyor units, preferably implemented as conveyor belts, with four separate drives, the distances between the trays at belt transitions can be changed such that the number of trays to be divided and conveyed can be increased to a maximum.

The lane sensors and/or the divider sensor may be optical sensors, primarily for reasons of cost, and/or photoelectric barriers for high operational reliability.

The release stops may have a common actuator, for example a pneumatic cylinder, so that both stops can be quickly and reliably deactivated at the same time in order to transfer a row of trays, or two trays located next to one another on two lanes, to subsequent conveyor belts. The stops are called "active" or "activated" here whenever they are in a position in which they (can) stop trays.

In one embodiment, the conveyor lane divider has a line motion control system that is designed to manage the current positions of the trays along the transport path by a controller. In this way the conveyor lane divider knows at all times where trays are located on the conveyor belts of the conveyor lane divider, and the controller can operate the divider unit appropriately and flexibly in order to achieve the maximum output.

In order to ensure optimal connection to or integration with the subsequent production unit, the controller can be the machine control system of the production unit. In this design, costs can also be minimized as compared with two individual controllers, each with an operating terminal, which communicate with one another, while simultaneously increasing process reliability and shortening intervals for transmission of signals.

In one embodiment, the fourth conveyor unit is reversible in its direction of belt travel so as to be able to detect the presence of a tray using only one lane sensor following a stoppage of the conveyor belt, since the trays can have different lengths and thus are not automatically sensed by the lane sensor when the conveyor belt is stopped.

The speed of the fourth conveyor unit can be higher than the speed of a third conveyor unit located directly upstream in order to produce a necessary distance between two successive trays. This ensures that when a pre-stop is activated it does not come into contact with a tray before reaching its end position. Such contact could result in damage to a tray or partial loss of product from the tray.

Likewise, the speed of the second conveyor unit can be higher than the speed of a first conveyor unit located directly upstream in order to produce a necessary distance between two successive trays. This allows a distance between all trays located in the region of the dividing device. By means of the controller, the conveyor lane divider is able to divide the trays in a flexible, output-optimized manner and is not dependent on predefined groups.

In one embodiment, the distance from the pre-stop opposite the direction of transport to the start of the fourth conveyor unit has a length that corresponds to the length of a tray plus a tolerance of about 20%. Firstly, this ensures that a distance between two successive trays can be created ahead of the pre-stop when belt speeds are different, and secondly, this region serves as a buffer for each lane.

It has proven to be particularly favorable when the number of a group of trays of one lane of a format of the subsequent production unit can be accommodated between the pre-stops and the divider sensor in each lane. In this way an optimal buffer section is provided and the overall length of the conveyor lane divider does not become unnecessarily large.

The first conveyor unit can have a surface with greater friction interacting with a bottom of the trays than the second conveyor unit. This makes it possible, firstly, for the conveyor lane divider to stop the trays that are to be received from an infeed conveyor when the first conveyor unit is stopped, even when the infeed conveyor continues to run. Secondly, as a result of the high friction of the tray bottom on the first conveyor unit the tray has this speed, and a desired distance between two successive trays for the divider unit can be produced by a controlled process through the speed difference of the subsequent second conveyor unit.

The method according to the invention for automatically initializing a conveyor lane divider of the above-described type, in which a line motion control system is provided in order to manage the current positions of trays along the transport path between the divider sensor and the release stop, provides for the following steps:

Ascertaining the presence of a tray in each lane ahead of the release stop by means of the lane sensor;
  a) if no tray has been detected in at least one lane: Deactivating the pre-stop of the lane that does not have a tray, and moving the third and fourth conveyor units to convey trays ahead of the release stops; and
  b) if a tray has been detected in both lanes: Moving the third and fourth conveyor units and deactivating the release stops and the pre-stops in order to transfer the first row of trays to the production unit, then activating release stops.

During this process, the operator can leave the trays on the conveyor units and can also remove trays without errors occurring during the transfer of trays to the production unit the next time the conveyor lane divider is started up.

The presence of a tray ahead of the release stop in each lane can be detected by the lane sensor by the fourth conveyor unit being moved backward, opposite the normal direction of transport, in order to have the lane sensor sense a tray that may be present at the release stop so as to ascertain the presence of a tray between the release stop and the pre-stop.

The following steps may be provided after a startup:
Starting the third and fourth conveyor units and releasing rows of trays ahead of the release stops until no more trays can be advanced to the release stop in one or both lanes;
Resetting the line motion control system for the empty lane (which is to say resetting the line motion control system with the information that the applicable lane does not contain any trays on the third and fourth conveyor units); and
Setting the conveyor lane divider to a lane that has been reset.

Consequently, an automatic reset of the line motion control system can take place without any operator assistance, regardless of the trays still located on the third and fourth conveyor units.

Automatic initialization of the conveyor lane divider is equivalent to every single lane of the conveyor lane divider being, or having been, "reset" simultaneously or sequentially in the sense that the line motion control system notes that the applicable lanes do not contain any more trays at a certain point in time. From this point in time onward, the line motion control system again has all the information on what trays are located at which positions along the conveyor lane divider behind the divider sensor, taking into account the data from the divider sensor and operation of the conveyor belts and/or the lane sensors.

In addition, in the case when just one lane is initialized, the first conveyor unit can be moved in order to provide the initialized lane with the maximum number of trays for a lane of a group until no more trays can be supplied to the release stop in the second, as yet not initialized, lane.

After an initialization during ongoing operation in accordance with the population of the lanes, which is determined by the line motion control system, the trays may be distributed to both lanes by means of the divider unit, preferably at least two trays per lane in alternation and less than the designated number per lane of a group.

Other and further objects of the invention, together with the features of novelty appurtenant thereto, will appear in the course of the following description.

DESCRIPTION OF THE SEVERAL VIEWS OF THE DRAWING

In the accompanying drawing, which forms a part of the specification and is to be read in conjunction therewith in which like reference numerals are used to indicate like or similar parts in the various views.

Like components are consistently labeled with like reference characters in the Figures.

DETAILED DESCRIPTION OF THE INVENTION

Figure 1:
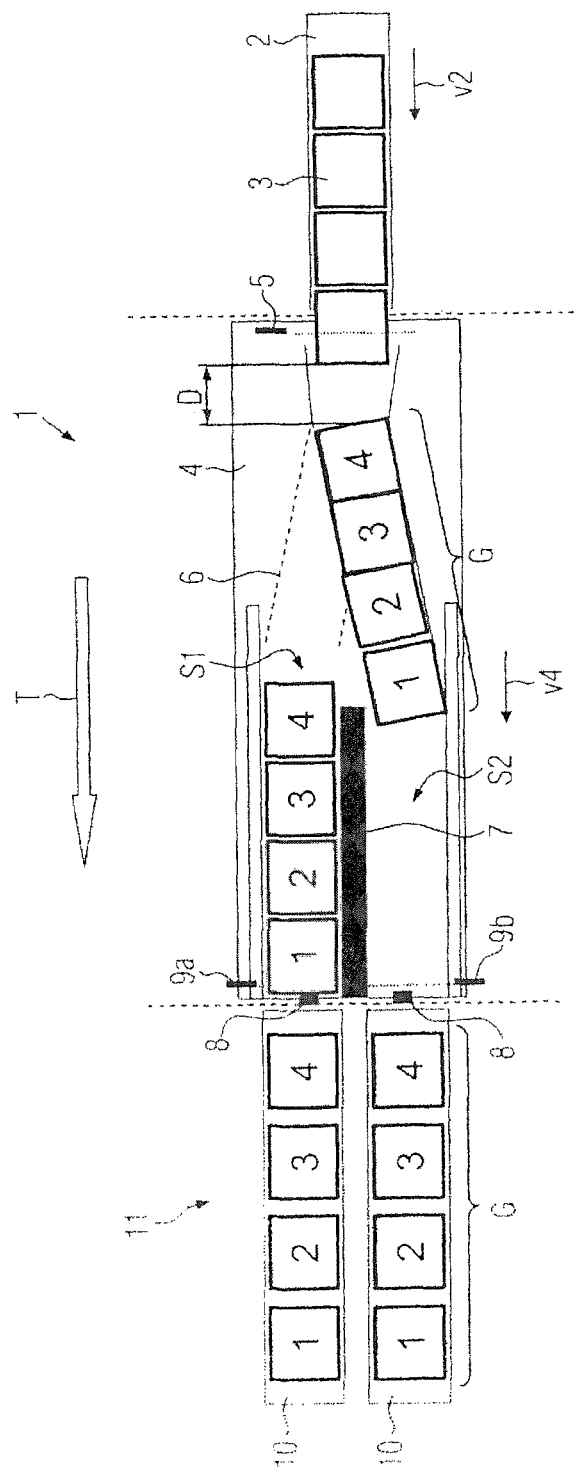
FIG. 1 is a schematic top view of a conveyor lane divider according to the prior art.

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

The following detailed description of the invention references specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

FIG. 1 shows a conveyor lane divider 1 according to the prior art in a schematic top view. The conveyor lane divider 1 receives trays 3 that are filled with product from a one-lane infeed conveyor 2, which is located upstream in the production direction T. The trays 3 are transferred to the conveyor belt 4 of the conveyor lane divider 1. During this process, each tray 3 is sensed by a photoelectric barrier 5 mounted at the front end of the conveyor belt 4. A controller—not shown—that regulates the drive of the conveyor belt 4 ensures that, once a number of trays has been sensed that is required for a group G of trays 3 in the subsequent production process, the speed v4 of the conveyor belt 4 of the conveyor lane divider 1 is increased enough relative to the speed v2 of the infeed conveyor 2 that a distance D is produced between the last tray (No. 4) of a group G and the first tray (No. 1) of the next trays 3 to be received by the infeed conveyor. In this way, a swivel mechanism 6 can pivot from one lane S1 to another lane S2 after one group G and before the next group G while the conveyor belt 4 is in motion, without a collision occurring between the first tray (No. 1) and a center guide 7.

Stops 8 are mounted at the end of the conveyor lane divider 1 in the production direction T for both lanes S1 and S2 in order to stop the groups G of trays 3 until a release of the production unit 11 while the conveyor belt 4 is in motion. The presence of a group G or of a first tray (No. 1) ahead of the stop 8 is sensed by means of photoelectric barriers 9a, 9b at each lane S1, S2. If the subsequent conveyor belts 10 of the subsequent production unit 11 are also ready to accept a new group G of trays 3 and if a complete group G is detected ahead of the stops 8 in both lanes S1, S2, then the stops 8 are deactivated or removed and all the groups G are transferred simultaneously. After a defined period of time, which depends on the speed V4 of the conveyor belt 4, the stops 8 are reactivated for the following groups G of trays 3.

If the conveyor lane divider 1 should happen to stop, the operator has to ensure that all trays 3 located on the conveyor belt 4 are removed, since the controller of the conventional conveyor lane divider 1 cannot detect whether, and where, trays 3 are already located on the conveyor belt 4 before the next startup. This is why the controller begins, after a subsequent restart, with counting the trays 3 at the beginning of the conveyor belt 4 by means of the photoelectric barrier 5 and forms groups G in alternation for each lane S1, S2.

If one or more trays 3 are removed from the conveyor belt 4 during production because of a flaw or for quality assurance purposes, this occurrence is not detected and an incomplete group G is transferred to the subsequent production unit 11. If this production unit 11 is a tray sealer, for example, one or more missing trays 3 in its sealing station can lead to machine stoppages. During the subsequent stoppage of the tray sealer, and thus also of the conveyor lane divider 1, the conveyor lane divider must again be cleared of all trays 3.

Figure 2:
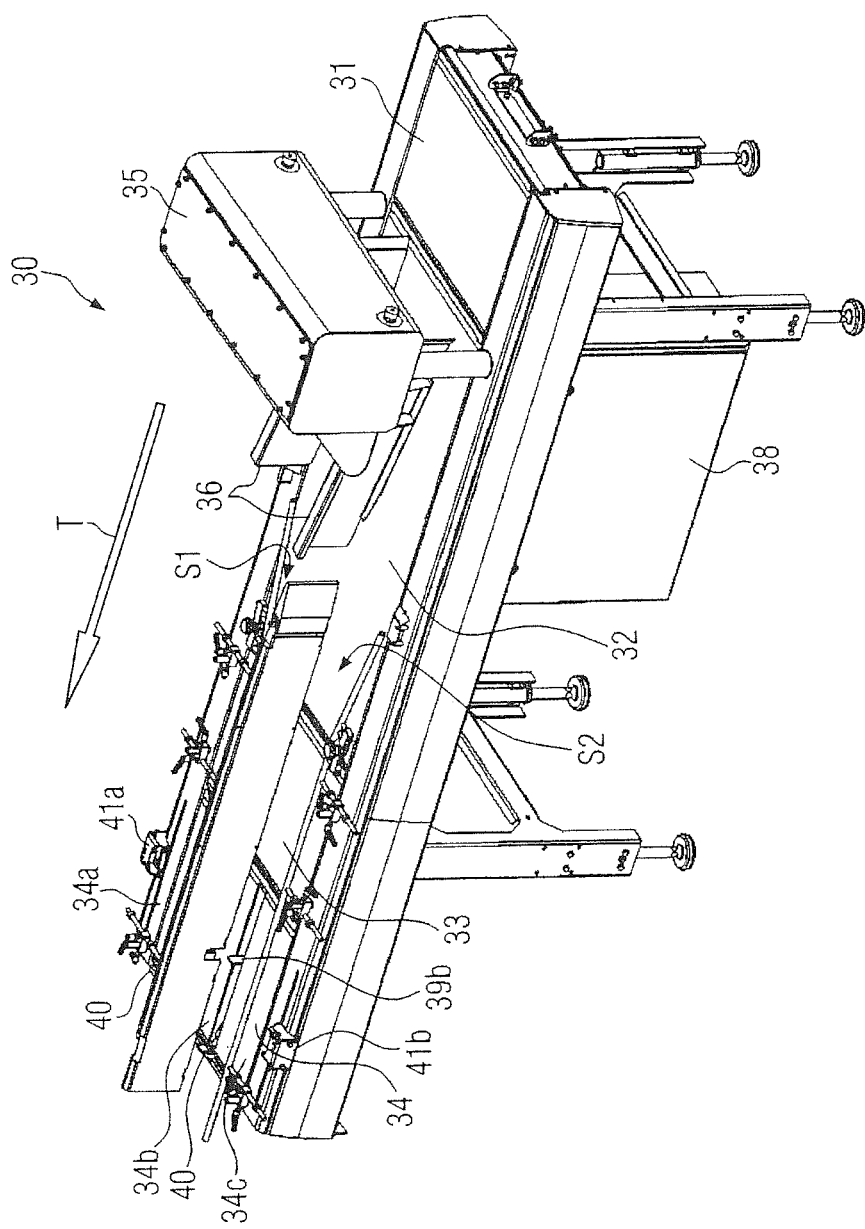
FIG. 2 is a schematic view of a conveyor lane divider in accordance with one embodiment of the present invention.

FIG. 2 shows a conveyor lane divider 30 according to one embodiment of the present invention with four conveyor units 31, 32, 33, 34 implemented as conveyor belts, which are arranged in succession in the direction of transport T. The conveyor belts 31, 32, 33, 34 each have their own drive (not shown), preferably a servomotor. A divider unit 35 is mounted above the second conveyor belt 32 in order to distribute trays 3 having a length L into the lanes S1 and S2.

The speed v32 of the second conveyor belt 32 is increased enough relative to the speed v31 of the first conveyor belt 31 that, after the transition of the trays from the first conveyor belt 31 to the second conveyor belt 32, a distance D is produced that is necessary in order to redirect the divider unit 35 from one lane S1, S2 to the other lane S1, S2 by a pivoting motion of two parallel guides 36 of the divider unit 35 between trays 3, and to divide. A divider sensor 37, here implemented as a photoelectric barrier, detects the tray 3 and forwards this information to a controller 38. The controller 38 can be a separate controller for the conveyor lane divider 30 or can also be the machine control system of a subsequent production unit, e.g. of a packaging machine, preferably a tray sealer. The photoelectric barrier 37 ensures that a pivoting motion of the guides 36 of the divider unit 35 only takes place when no trays 3 are located in the sensing range of the photoelectric barrier 37. The photoelectric barrier 37 here can detect an end of the tray 3 and transmit this signal to the controller 38 as the enable signal for the pivoting motion.

The third conveyor belt 33 serves as a buffer belt and is driven at a lower speed v33 than the second conveyor belt 32 located ahead of it. At the fourth and last conveyor belt 34, which here is implemented in the form of three jointly driven conveyor belts 34a, 34b and 34c running parallel to one another, two pre-stops 39a, 39b and two release stops 40 may be provided for the two lanes S1, S2. The pre-stops 39a and 39b can be operated separately, while the release stops 40 preferably have one common actuator, or two actuators that can be activated synchronously, so that they can simultaneously each deliver one tray 3 per lane S1, S2 to the subsequent production unit 11.

Photoelectric barriers 41a, 41b can be provided between the pre-stop 39a, 39b and the release stop 40 for each lane S1, S2 in order to detect the presence of a tray 3 for a transfer to the subsequent conveyor belt 10, and to detect the back end of the tray 3, in order to activate the pre-stop 39a, 39b between two successive trays 3 so that the tray 3 is not lifted by a pre-stop 39a, 39b. This would otherwise have the result that at least some of the product gets out of the tray 3. This could result in contamination of the conveyor belts, and the tray itself would have to be rejected.

Figure 3:
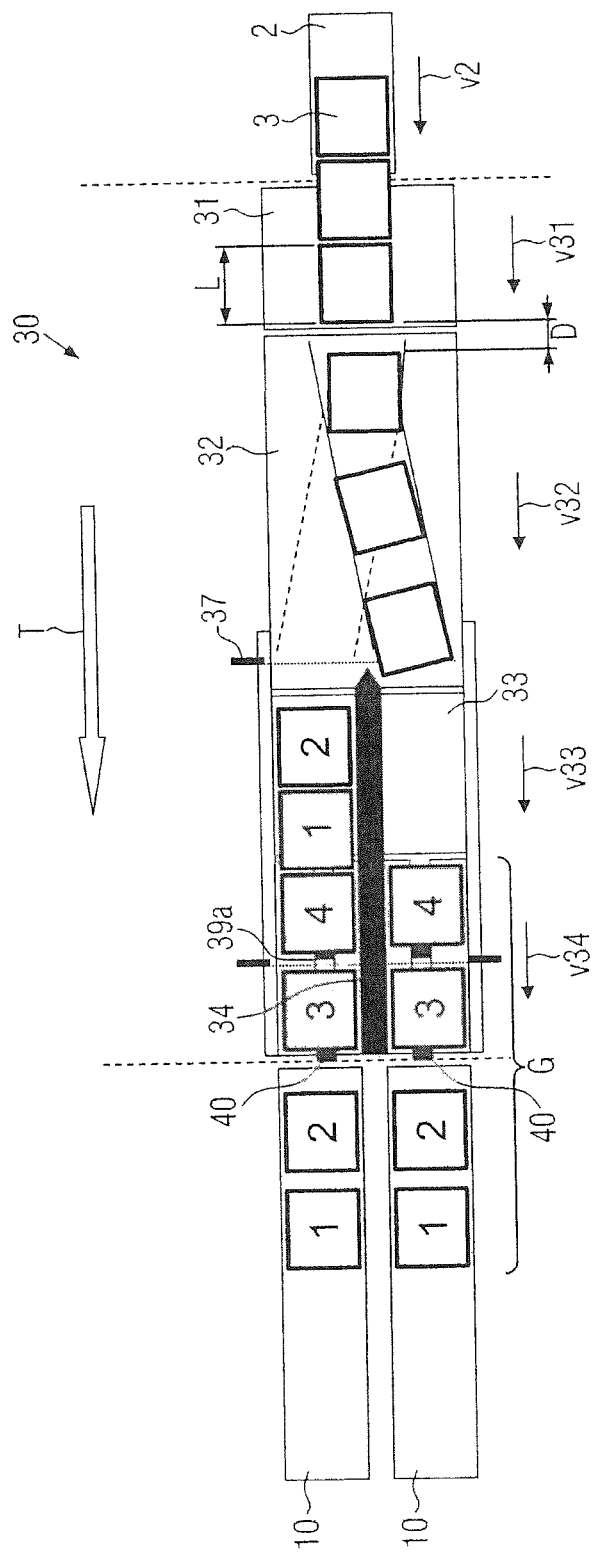
FIG. 3 is a schematic top view of the conveyor lane divider shown in FIG. 2 during on-going operation in a first phase in accordance with one embodiment of the present invention.

Referring to FIGS. 3 through 9, the sequence during ongoing operation and an initialization phase are explained in detail. On the right-hand side, FIG. 3 shows a one-lane infeed conveyor 2 and on the left-hand side, two conveyor belts 10 of production equipment 11. So that the production equipment 11 can operate properly, in this exemplary embodiment a group G of four trays per group must be transferred to the conveyor belts 10 in each case. Since the conveyor belts 10 can have one common drive, the trays 3 of both groups G must be arranged exactly parallel to one another in the direction of transport T. In consequence, the trays 3 have to be transferred in two lanes synchronously or at the same time to the conveyor belts 10 by the conveyor lane divider 30. The group G is not restricted to only four trays 3, but rather permits any other number of trays 3.

At a running conveyor belt speed v2, the infeed conveyor 2 provides trays 3, which typically are lined up in a row. In this context, the infeed conveyor 2 has a surface with low friction. The first conveyor belt 31 of the conveyor lane divider 30 has a higher friction than the infeed conveyor 2. On the one hand, the flow of trays 3 on the infeed conveyor 2 can be stopped as a result when the conveyor belt 31 is not moving. On the other hand, high friction is necessary to produce a certain distance D between two successive trays 3 during the transition of the trays 3 from the conveyor belt 31 running at the speed v1 to the conveyor belt 32 running at the speed v2. Low friction on the first conveyor belt 31 could result in a movement of the trays 3 that is not equal to the speed v1 of the running conveyor belt 31, and consequently there would be no guarantee that the speed regulation of the second conveyor belt 32 by the controller 18 would produce the distance D between two successive trays 3.

During ongoing operation, all conveyor belts 31, 32, 33, 34 are moving. By means of the divider unit 35, the trays 3 are divided such that two trays 3 at a time are distributed to the lanes S1, S2 in alternation. The photoelectric barrier 37 senses the trays 3 and, due to the positioning of the guides 36, each tray 3 is registered by the line motion control system with the result that the current position of the trays 3 continues to be tracked during further transport on the third and fourth conveyor belts 33, 34. When such a line motion control system is used between the photoelectric barrier 37 and the release stops 40, the controller 38 is able to control the divider unit 35 such that a uniform or optimum distribution of the trays 3 in the lanes S1, S2 can take place, and consequently output can be increased compared to the prior art. Output is defined here as the capability to divide and to transfer as many trays 3 as possible from a single-lane infeed conveyor 2 to two conveyor belts 10 in as short a time as possible.

Figure 4:
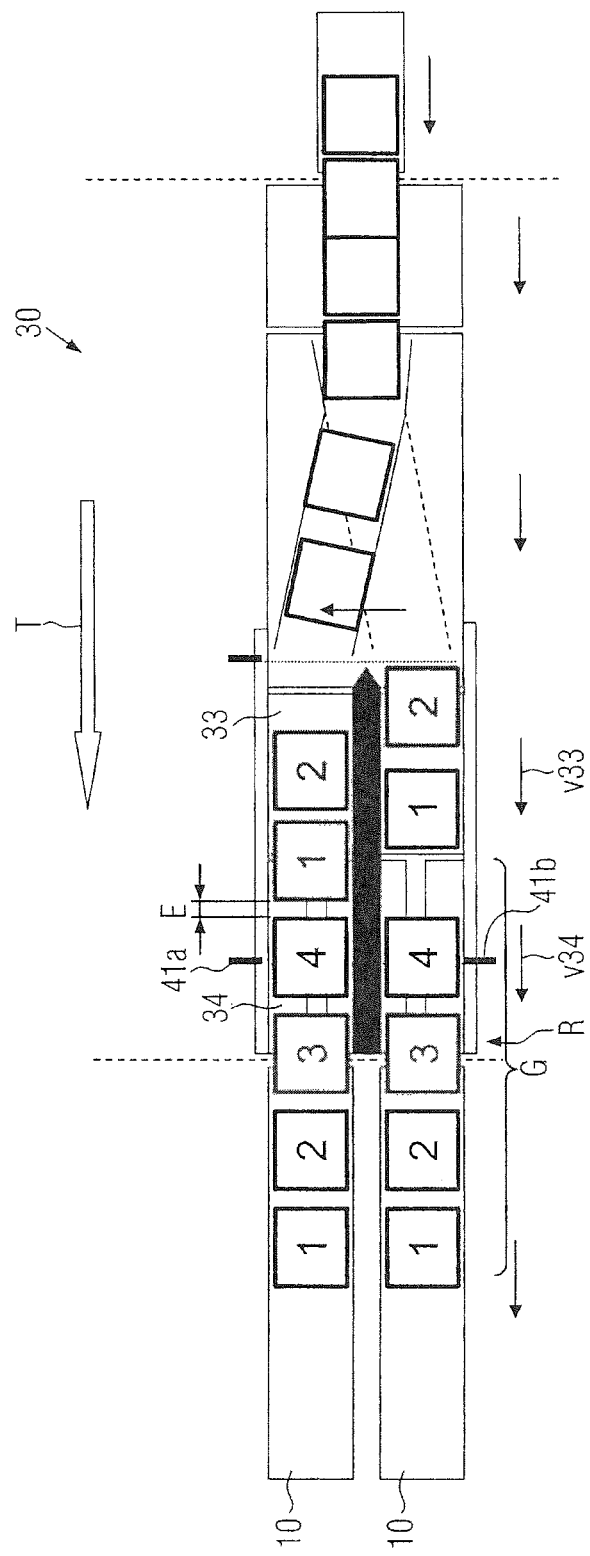
FIG. 4 is a schematic top view of the conveyor lane divider shown in FIG. 2 during on-going operation in a second phase in accordance with one embodiment of the present invention.

The numbers (No.) "1" through "4" on the trays 3 each represent a group G. The pre-stops 39a, 39b keep the tray (FIG. 3 No. 3) located ahead of the release stop 40 clear of subsequent trays, so that different thrust forces resulting from a different number of trays 3 do not act on the tray (FIG. 3 No. 3). This ensures that the two forwardmost trays (FIG. 3 No. 3) are transferred synchronously as a row R from the fourth conveyor belt 34 to the conveyor belts 10 when the release stops 40 are deactivated, as shown in FIG. 4. The pre-stops 39a, 39b can also be deactivated simultaneously with the release stops 40 in order to make a new tray (FIG. 4 No. 4) available in the transfer position directly ahead of the release stops 40. In this process, the photoelectric barrier 41a, 41b detects the back end of the tray 3. Since the speed v4 of the fourth conveyor belt 34 is higher than the speed v3 of the third conveyor belt 33, a distance E between two trays 3 is produced that is necessary for the pre-stops 39a, 39b to be able to be activated between two trays 3 without colliding with them.

Figure 5:
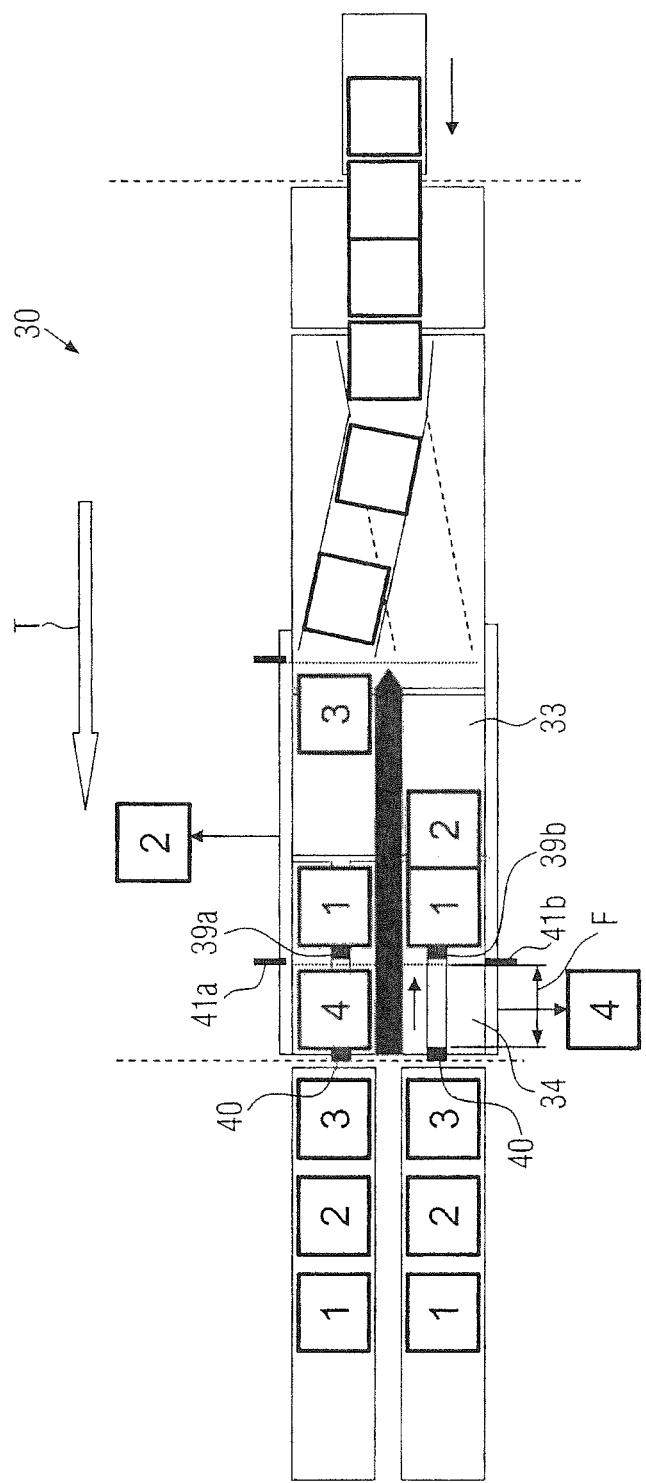
FIG. 5 is a schematic top view of the conveyor lane divider shown in FIG. 4 at the start of an initialization phase in accordance with one embodiment of the present invention.

FIG. 5 shows the situation after the production system has come to a stop, in which also the conveyor lane divider 30, and thus all conveyor belts 31, 32, 33, 34, have been stopped. During the stoppage it can happen that individual trays 3 are removed, for example for testing purposes, or some trays 3 are removed and rejected as faulty. In this example, the tray No. 2 in the top lane S1 and the tray No. 4 in the bottom lane S2 have been removed. So that the operator does not have to remove all trays 3 located on the conveyor line divider 30—in contrast to the prior art—according to the invention an automatic initialization process is provided that makes it possible to automatically initialize the lanes S1 and S2 without the operator's assistance, so that the line motion control system 38 is again capable of recognizing all trays 3 in both lanes S1, S2 and to optimally control the speeds v1, v2, v3, v4 of the conveyor belts 31, 32, 33, 34 and the divider unit 35 to achieve maximum output.

The initialization proceeds as follows. As indicated in FIG. 5 by an arrow pointing to the right on the fourth conveyor belt 34, only the fourth conveyor belt 34 is moved opposite to the direction of transport T, by a maximum of the distance F between the release stop 40 and the pre-stop 39a, 39b, in order to determine the lane S1, S2 in which a tray 3 is already present. The other conveyor belts 31, 32, 33 are still stopped and the pre-stops 39a, 39b are activated.

Figure 6:
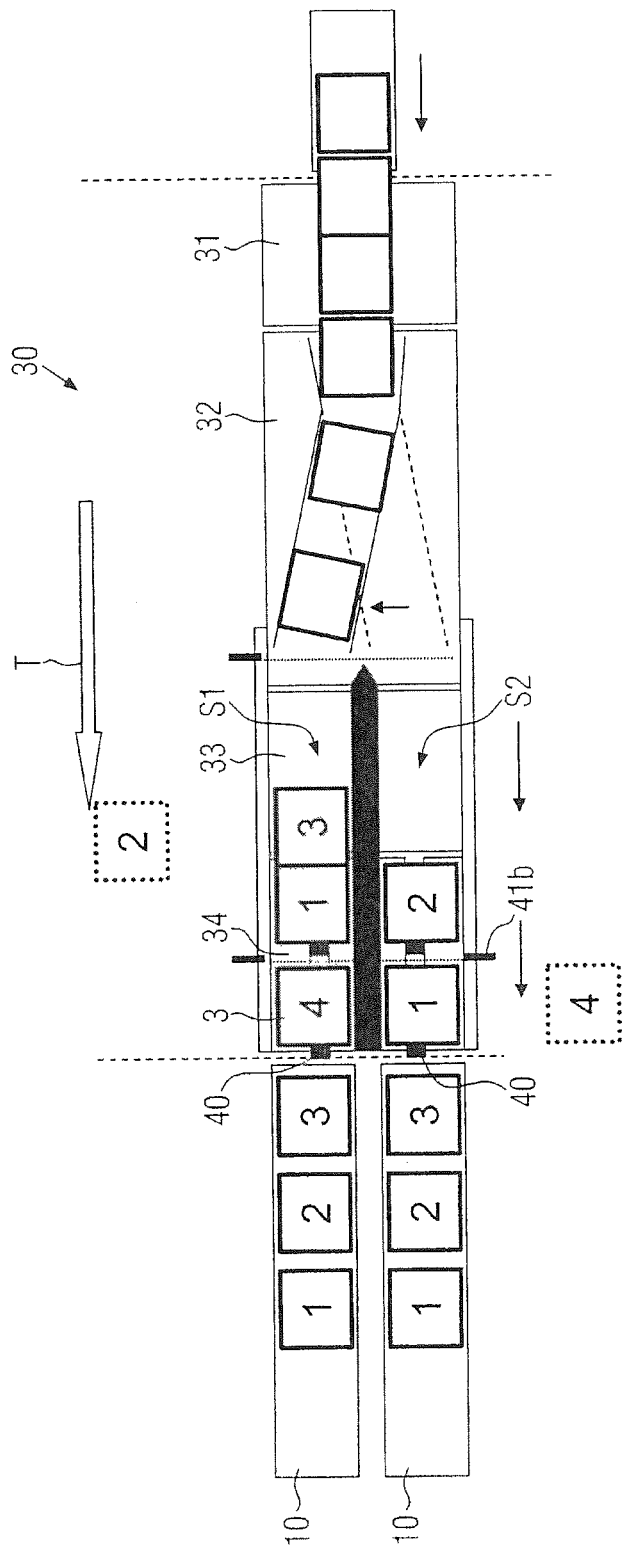
FIG. 6 is a schematic top view of the conveyor lane divider shown in FIG. 5 during the further course of the initialization phase in accordance with one embodiment of the present invention.
Figure 7:
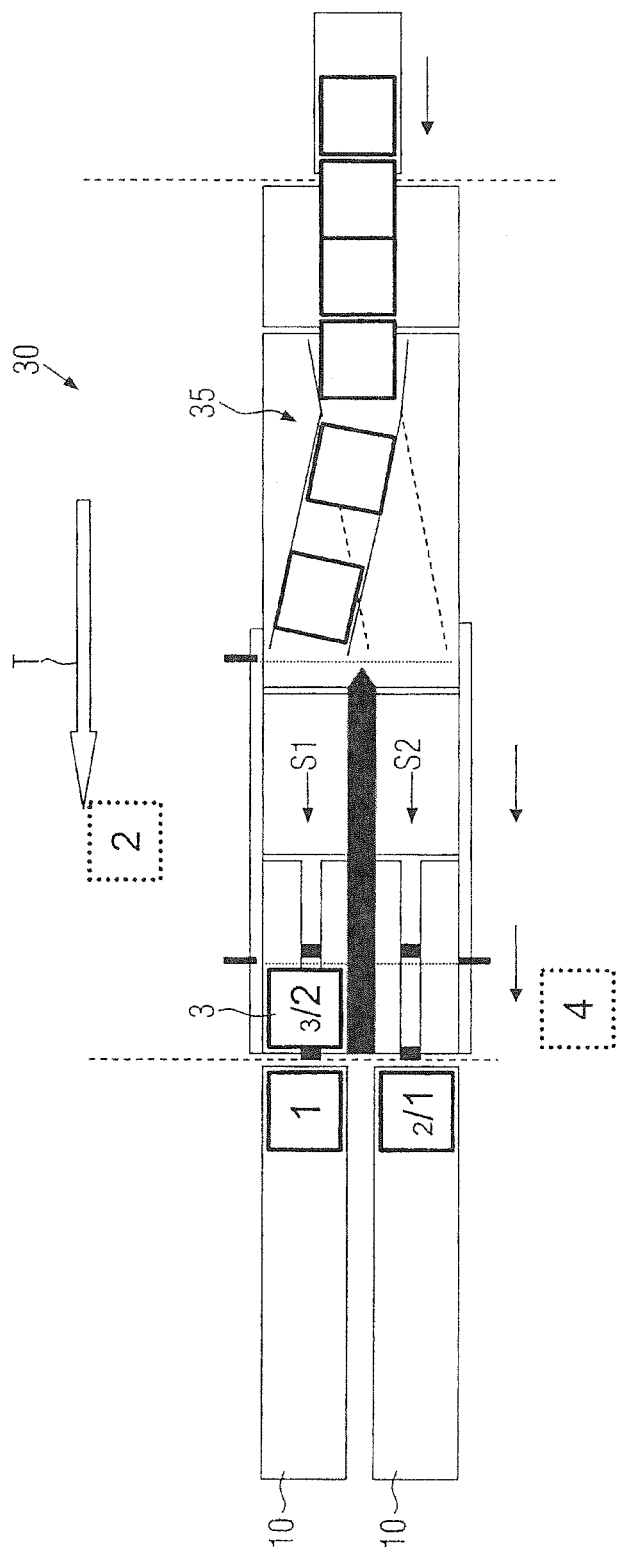
FIG. 7 is a schematic top view of the conveyor lane divider shown in FIG. 6 during the further course of the initialization phase in accordance with one embodiment of the present invention.

Then, as shown in FIG. 6, the third and fourth conveyor belts 33, 34 are moved in the direction of transport T and the pre-stop 39b, in whose lane S2 no tray 3 was detected by the photoelectric barrier 40b, is deactivated. As a result, a next tray 3, if one is present, can be transported ahead of the release stop 40. The pre-stop 39b is reactivated ahead of the subsequent tray (No. 2 in FIG. 6). The trays 3 continue to be transferred to the conveyor belts 10 until the controller 38 recognizes, by means of a photoelectric barrier 41b, that no trays 3 are present in the lane S2 (see FIG. 7). In the meantime, the completed groups G on the conveyor belts 10 are conveyed onward within the production unit 11, and additional trays 3 can be transferred from the conveyor lane divider 30 to the conveyor belts 10.

Now this lane S2 can be "reset" such that the line motion control system notes that the lane S2 has no trays. If no more trays 3 are present in both lanes S1, S2, then both lanes S1, S2 or the line motion control system for both lanes S1, S2 can be reset at this time. The divider unit 35 then sets itself accordingly to the lane S2 that does not have any trays 3. If it was possible to reset both lanes S1, S2, the divider unit 35 remains in its current position.

Figure 8:
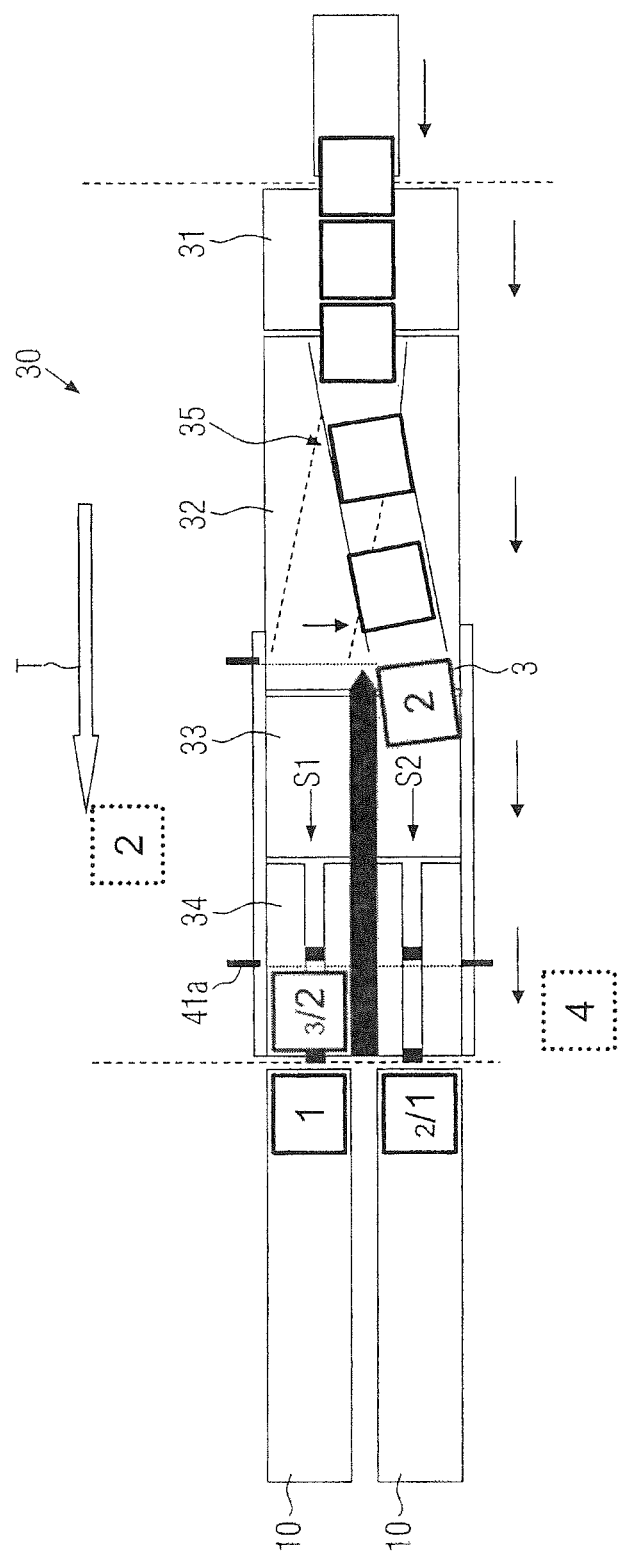
FIG. 8 is a schematic top view of the conveyor lane divider shown in FIG. 7 during the further course of the initialization phase in accordance with one embodiment of the present invention.
Figure 9:
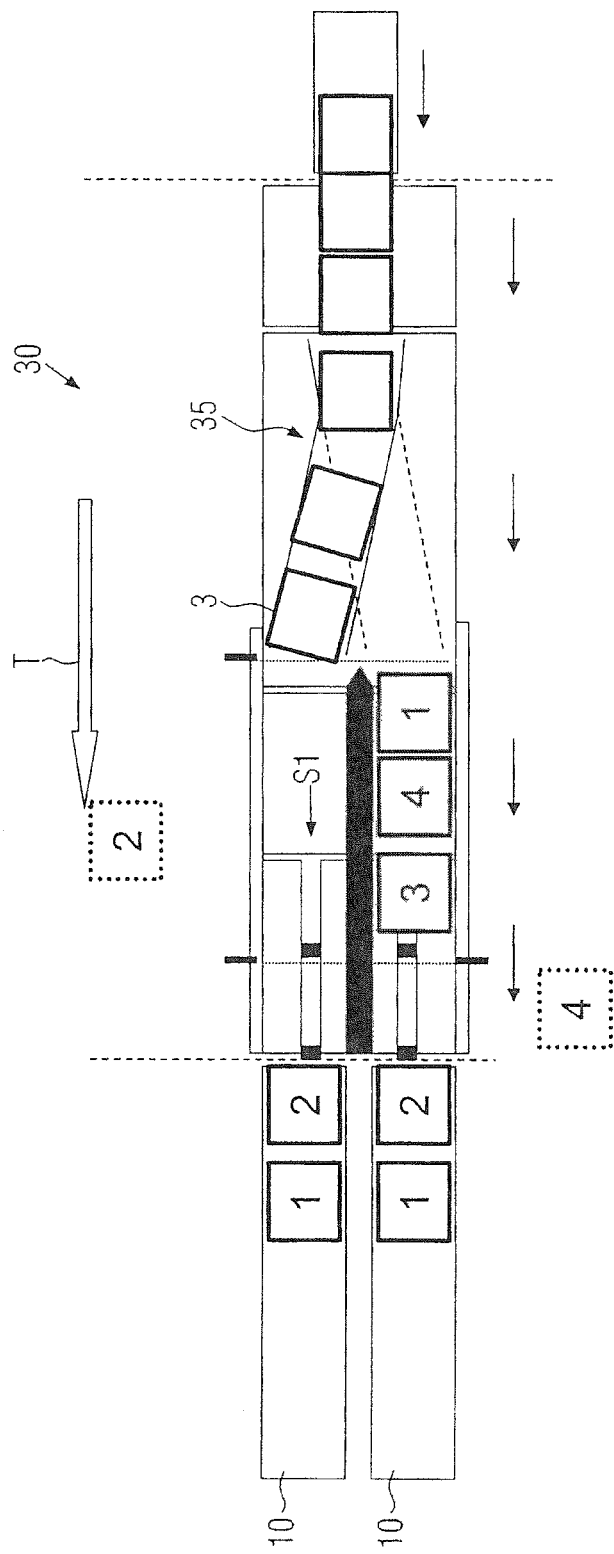
FIG. 9 is a schematic top view of the conveyor lane divider shown in FIG. 8 at the end of the initialization phase in accordance with one embodiment of the present invention.

FIG. 8 shows the above-described case, in which one tray 3 is still present in the top lane S1 and only the bottom lane S2 could be reset. Now new trays 3 are supplied to the lane S2 and transferred together with the trays 3 from the lane S1 to the conveyor belts 10 until such time as the controller 38 detects, by means of the photoelectric barrier 41a, that the lane S1 also does not have any more trays 3. Consequently the line motion control system can also be reset at this time for the lane S1, with operation already ongoing of the conveyor lane divider 30 and all conveyor belts 31, 32, 33, 34. Now the conveyor lane divider 35 subsequently supplies trays 3 to lane 1, see FIG. 9. By means of settings in the controller 38, the mode or the logic for the divider unit 35 can be changed such that the maximum output for ongoing operation is achieved.

The automatic initialization functions even when trays have not been removed during the stoppage (see FIG. 5), but instead new trays 3 have additionally been placed on the third conveyor belt 33 or the fourth conveyor belt 34.

The conveyor lane divider 30 according to the invention is not limited to distributing trays 3 or products from a one-lane feeding system 2 to a two-lane system. Distribution to three or more lanes is also possible. An additional release stop, pre-stop, and photoelectric barrier for each additional lane are needed in analogous fashion.

An important advantage of the invention is that trays are no longer transferred to the subsequent production unit only in complete groups in one lane at a time, as in conventional conveyor lane dividers. Instead, full rows of trays are always transferred in parallel to the subsequent production unit, which significantly increases the efficiency of the conveyor lane divider and thus of the packaging system as a whole. When the information noted in the line motion control system is taken into account, it is possible to distribute the trays arriving at the conveyor lane divider to the various lanes in a time-optimized way. In particular, it is possible for the divider unit to refrain from changing lanes after each individual tray 3, which would be rather inefficient, but instead to transfer two, three, or generally multiple trays 3 to a certain lane S1, S2 in a single step before the divider unit 35 switches to the other lane.

From the foregoing, it will be seen that this invention is one well adapted to attain all the ends and objects hereinabove set forth together with other advantages which are obvious and which are inherent to the structure. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions and methods described above and illustrated in the drawings are presented by way of example only and are not intended to limit the concepts and principles of the present invention. Thus, there has been shown and described several embodiments of a novel invention. As is evident from the foregoing description, certain aspects of the present invention are not limited by the particular details of the examples illustrated herein, and it is therefore contemplated that other modifications and applications, or equivalents thereof, will occur to those skilled in the art. The terms "having" and "including" and similar terms as used in the foregoing specification are used in the sense of "optional" or "may include" and not as "required". Many changes, modifications, variations and other uses and applications of the present construction will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. Conveyor lane divider for dividing a one-lane flow of trays into two lanes, the conveyor lane divider comprising:
   first, second, third and fourth conveyor units in succession in a direction of transport, each of which has a drive;
   the conveyor lane divider further comprising,
   a divider unit;
   a divider sensor;
   two pre-stops;
   two release stops designed to simultaneously release a first row of trays for further transport to a subsequent production unit; and
   a lane sensor provided between the release stop and the pre-stop of each lane in order to detect the presence of a tray between the release stop and the pre-stop and/or the back end of a tray for every lane, and
   wherein a distance from the pre-stop opposite the direction of transport to the beginning of the fourth conveyor unit corresponds to a length of a tray plus a tolerance of up to 20%.

2. Conveyor lane divider according to claim 1, wherein the lane sensors and/or the divider sensor are optical sensors, preferably photoelectric barriers.

3. Conveyor lane divider according to claim 1, wherein the release stops have a common actuator, preferably a pneumatic cylinder.

4. Conveyor lane divider according to claim 1 further comprising a line motion control system that is designed to manage the positions of the tray's along a transport path by a controller.

5. Conveyor lane divider according to claim 4, wherein the controller is the machine control system of the production unit.

6. Conveyor lane divider according to claim 1, wherein a speed of the fourth conveyor unit is higher than a speed of the third conveyor unit, the third conveyor unit being located directly upstream of the fourth conveyor unit in order to produce a distance between two successive trays.

7. Conveyor lane divider according to claim 1, wherein a speed of the second conveyor unit is higher than a speed of the first conveyor unit, the first conveyor unit being located directly upstream of the second conveyor unit in order to produce a distance between two successive trays.

8. Conveyor lane divider according to claim 1, wherein the number of trays of a group of one lane to be further processed in the subsequent production unit can be accommodated between the pre-stops and the divider sensor in each lane of the conveyor lane divider.

9. Conveyor lane divider according to claim 1, wherein the first conveyor unit has a higher friction on the surface interacting with a bottom of the trays than the second conveyor unit.

10. Method for automatically initializing a conveyor lane divider adapted for dividing a one-lane flow of trays into two lanes, the method comprising the steps of:
    providing a conveyor lane divider having first, second, third and fourth conveyor units in succession in a direction of transport, a divider sensor, two release stops designed to release a first row of trays for further transport to a subsequent production unit, and a lane sensor provided between the release stop and the pre-stop of each lane;
    providing a line motion control system for managing the positions of trays along a transport path between the divider sensor and the release stops;
    ascertaining the presence of a tray in each lane ahead of the release stops by means of at least one of the lane sensors, wherein the fourth conveyor unit is moved backward in order to have one of the lane sensors sense a tray that may be present at one of the release stops so as to ascertain the presence of a tray between that release stop and one of the pre-stops, and wherein;
    a) if no tray has been detected in at least one lane, deactivating the pre-stop of the lane that does not have a tray, and moving the third and fourth conveyor units to convey trays ahead of the release stops;
    b) if a tray has been detected in both lanes, moving the third and fourth conveyor units and deactivating the release stops and the pre-stops in order to transfer the first row of trays to the production unit, then activating the release stops.

11. Method according to claim 10 further comprising the following steps:
    starting the third and fourth conveyor units and releasing rows of trays ahead of the release stops until no more trays can be advanced to the release stop in one or both lanes;
    resetting the line motion control system for the empty lane; and
    setting the conveyor lane divider to a lane that has been reset.

12. Method according to claim 11, wherein when just one lane is reset, the first conveyor unit is moved in order to provide the lane that has been reset with the maximum number of trays for a lane of a group until no more trays can be supplied to the release stop in the second lane that has not as yet been reset.

13. Method according to claim 10, wherein, in accordance with a population of the lanes, which is determined by the line motion control system, the trays are distributed to both lanes by means of a divider unit, preferably at least two trays per lane in alternation and less than the designated number per lane of a group.

14. Conveyor lane divider for dividing a one-lane flow of trays into two lanes, the conveyor lane divider comprising:
   first, second, third and fourth conveyor units in succession in a direction of transport, each of which has a drive;
   the conveyor lane divider further comprising a divider unit;
   a divider sensor;
   a first pre-stop disposed on a first conveyor lane;
   a second pre-stop disposed on a second conveyor lane;
   a first release stop disposed on the first conveyor lane, downstream of said first pre-stop;
   a second release stop disposed on the second conveyor lane, downstream of said second pre-stop, wherein the release stops being operable to simultaneously release a first row of trays for further transport to a subsequent production unit, wherein the release stops have a common actuator; and
   a first lane sensor provided between the first release stop and the first pre-stop; and
   a second lane sensor provided between the second release stop and the second pre-stop, wherein the sensors are operable to detect the presence of a tray between the release stop and the pre-stop and/or the back end of a tray.

15. The conveyor lane divider of claim 14 wherein the common actuator is a pneumatic cylinder.

16. The conveyor lane divider of claim 14 wherein the pre-stops and the release stops are disposed on the fourth conveyor unit, the fourth conveyor unit being operable in a direction in reverse of the direction of transport, and the sensors being operable to detect the back end of a tray upon the operation of the fourth conveyor unit in the reverse direction.

17. Conveyor lane divider according to claim 1, wherein the fourth conveyor unit is reversible in its direction of travel.

* * * * *